United States Patent
Hu et al.

(10) Patent No.: US 11,692,867 B2
(45) Date of Patent: Jul. 4, 2023

(54) POLARIZATION DIVERSITY COMBINING METHOD IN COHERENT DAS MAINTAINING PHASE CONTINUITY

(71) Applicant: NEC Laboratories America, Inc., Princeton, NJ (US)

(72) Inventors: Junqiang Hu, Davis, CA (US); Yue-Kai Huang, Princeton, NJ (US); Ezra Ip, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/506,471

(22) Filed: Oct. 20, 2021

(65) Prior Publication Data

US 2022/0120608 A1 Apr. 21, 2022

Related U.S. Application Data

(60) Provisional application No. 63/094,361, filed on Oct. 21, 2020.

(51) Int. Cl.
*G01H 9/00* (2006.01)
*G02B 6/42* (2006.01)

(52) U.S. Cl.
CPC ............ *G01H 9/004* (2013.01); *G02B 6/4212* (2013.01)

(58) Field of Classification Search
None
See application file for complete search history.

(56) References Cited

U.S. PATENT DOCUMENTS

| | | | |
|---|---|---|---|
| 2015/0270895 A1* | 9/2015 | Fink | H04Q 11/0067 398/16 |
| 2016/0191163 A1* | 6/2016 | Preston | G01B 11/161 398/16 |
| 2017/0356793 A1* | 12/2017 | Nishiguchi | G01H 9/006 |
| 2020/0249076 A1* | 8/2020 | Ip | G01H 9/004 |

OTHER PUBLICATIONS

Gu et al Comparison of three combining methods for polarization-diversity receiving in φ-OTDR. In: The 23rd Opto-Electronics and Communications Conference (OECC), IEEE, Jul. 6, 2019 (Year: 2019).*

* cited by examiner

*Primary Examiner* — Brandi N Hopkins
*Assistant Examiner* — Nigel H Plumb
(74) *Attorney, Agent, or Firm* — Joseph Kolodka (57) ABSTRACT

A distributed optical fiber sensing (DOFS)/distributed acoustic sensing (DAS) method employing polarization diversity combining and spatial diversity combining for a DOFS/DAS system wherein the polarization diversity combining determines a temporal average product for each beating product, determines one having a max average power, rotates that one having max average power for its phase shift to produce a reference, determines a phase difference for each beating product as compared to the reference, compensates any phase difference such that all beating products exhibit a well-aligned phase; and combining the beating products; and wherein the spatial diversity combining uses the combined beating products for each location, determines a temporal average power, determines a location having a greatest average power; and combines the results and provides an indicia of the combined result(s).

2 Claims, 13 Drawing Sheets

POLARIZATION DIVERSITY COMBINING METHOD IN COHERENT DAS MAINTAINING PHASE CONTINUITY

CROSS REFERENCE

This disclosure claims the benefit of U.S. Provisional Patent Application Ser. No. 63/094,361 filed Oct. 21, 2020 the entire contents of which is incorporated by reference as if set forth at length herein.

TECHNICAL FIELD

This disclosure relates generally to distributed optical fiber sensing (DOFS) systems, methods, and structures. More particularly it pertains to polarization diversity combining of beating products in coherent distributed acoustic sensing (DAS) systems, which includes both polarization diversity and spatial diversity.

BACKGROUND

Distributed acoustic sensing (DAS) using coherent Rayleigh backscattering in an optical fiber has become a ubiquitous technique for monitoring multiple dynamic events in real time, due to its useful application in numerous safety, security, and integrity monitoring systems. As such, improvements in the technique would be a welcome addition to the art.

SUMMARY

An advance in the art is made according to aspects of the present disclosure directed to a method for polarization diversity combining in coherent DAS that maintains phase continuity.

In sharp contrast to the prior art, the method according to aspects of the present disclosure advantageously considers beating products within a location to be $\zeta_i(n)$ ($i=1, 2, \ldots d$, where d is the number of the polarization diversity, i.e., 4; n is time). The method first determines one exhibiting maximum averaged power, then rotates all other diversity terms to align with it. Advantageously, to preserver phase continuity when maximum power changes from $\zeta_i$ to $\zeta_j$, the present method uses the rotated result $\xi_j(n) \, e^{\varphi_j(n-1)}$ as reference, to determine the phase difference with other beating products. The phase rotation $\varphi_j(n-1)$ for $\zeta_j(n)$ remains constant ($\varphi_j(n-1)=\varphi_j(n)=\varphi_j(n+1)= \ldots$) as long as $\xi_i$ has the maximum averaged power.

With respect to spatial diversity combining, the method of according to aspects of the present disclosure utilizes a combined output $\zeta[n]$ from each location (i.e., $\zeta^l(n)$), determines each individual one's complex average $\overline{\zeta^l(n)}$, and then rotates all the other locations to the same pointing direction as one exhibiting maximum averaged power. If we let the one with maximum average power be $\zeta^m(n)$, the rotation for $\zeta^l(n)$ will be angle($\overline{\zeta^l(n)}^* \cdot \overline{\zeta^m(n)}$). To keep the phase continuity when the maximum power changes from one location ($\zeta^i(n)$) to another ($\zeta^j(n)$), the present invention uses the same approach, namely, utilizing the rotated direction of $\zeta^j(n)$ as reference and makes all other locations point to this reference direction before combining.

Of further advantage, since frequency (including lambda) diversity is another scheme to solve Rayleigh fading, our method according to aspects of the present disclosure can advantageously be applied to frequency diversity combining in the same way as polarization diversity—and processed together—in a same step for the F*d beating products where F is the number of frequencies or lambdas, and d is the number of polarization combinations.

BRIEF DESCRIPTION OF THE DRAWING

A more complete understanding of the present disclosure may be realized by reference to the accompanying drawing in which:

FIG. 6(A), FIG. 6(B) FIG. 6(C) FIG. 6(D), are a series of plots illustrating spike suppression using spatial diversity combining for FIG. 6(A) vibration output without spatial combining; FIG. 6(B) vibration output with spatial combining using 3 neighbor locations; and FIG. 6(C), FIG. 6(D) zoomed in illustrations respectively for FIG. 6(A) and FIG. 6(B) plots to show spike improvements in quiet regions according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

We note that differential detection of Rayleigh backscatter is a well-known technique used in distributed acoustic sensing (DAS). To better understand it operationally, consider r(z) is the scalar value of the Rayleigh back-reflection at position z along a fiber. A longitudinal stress of σ between two points z and z+Δz will cause their optical distance to stretch by δz=σEΔz, where E is the Young's modulus of glass comprising the fiber. In presence of an acoustic vibration which causes time-varying longitudinal stress of σ(t), the differential product of Rayleigh backscatter may be phase modulated:

$$r(z+\Delta z)r^*(z) = |r(z+\Delta z)||r(z)|\exp\left(-j\frac{2\pi n}{\lambda}E\Delta z\ \sigma(t)\right), \quad (1)$$

where n phase velocity index of the fiber and λ is the wavelength of interrogation.

In a conventional DAS system, the interrogator transmits rectangular pulses p(t)=rect(t/T) down a fiber under test (FUT), where the pulse width T corresponds to spatial resolution of $z_{res}=(c/2n_{eff})T$, with c being the speed of light and $n_{eff}$ being the group index of pulse propagation down the fiber. The received Rayleigh backscatter is given by convolution:

$$q(t)=\int_{-\infty}^{\infty}p(\tau)r(t-\tau)d\tau \quad [2]$$

with time-of-flight t related to fiber position by $z=(c/2n_{eff})t$. When the FUT undergoes longitudinal stretching, each infinitesimal Rayleigh reflection component r(t) will undergo phase shift according to Eq. (1). The output q(t) will experience amplitude fading when the components r(t) add destructively in phase. Hence, the delay interferometric product $q(t)q^*(t-T_i)$ where $T_i$ is the delay of the interferometer will not only have phase modulation, but will also suffer from "Rayleigh fading". When either |q(t)| or |q(t−$T_i$)| are close to zero, receiver noise will make the phase of the delay interferometric product susceptible to phase noise and phase discontinuity.

Diversity Combining

It is possible to mitigate Rayleigh fading by using 'diversity'. Methods of achieving diversity includes:

(i) Polarization diversity: Polarization rotation of both the transmitted pulse and the Rayleigh backscatter during propagation means that the received signal $q(t)=[x(t)\ y(t)]^T$ will have two polarization components. It is possible to construct four delay interferometric products $x(t)x^*(t-T_i)$, $x(t)y^*(t-T_i)$, $y(t)x^*(t-T_i)$ and $y(t)y^*(t-T_i)$, and combine them in such fashion to mitigate fading.

(ii) Spatial diversity: It is possible to combine delay interferometric products based on $q(t_1), \ldots, q(t_k)$ for fiber positions $\{z_1, \ldots, z_k\}$ within a neighborhood. Unfortunately, this will sacrifice spatial resolution.

(iii) Frequency diversity: It is possible to transmit pulses at different wavelengths spaced far enough apart so that the delay interferometric products based on $q_1(t), \ldots, q_N(t)$ fade independently. This may require more hardware and more digital signal processing at the receiver.

Irrespective of whether techniques (i)-(iii), or a combination of these techniques are used, a method to combine delay interferometric products arising from different sources is necessary. Let $b_1[l, m], \ldots, b_{N_b}[l, m]$ represent $N_b$ delay interferometric products to be combined, where l is the position index, and m is the time index which assumes the acoustic vibration is sampled at a rate of $T_f$ equal to the pulse repetition period. All the $b_k[l, m]$ terms are identically phase-modulated by the longitudinal vibration at that fiber position (i.e., ~exp $$\left(-j\frac{2\pi n}{\lambda}E\Delta z\ \sigma(mT_f)\right)$$

as per Eq. (1)). However, the amplitudes of each individual $|b_k[l, m]|$ may fade at certain time indices m. Diversity combining computes:

$$\zeta[l, m] = \sum_{k=1}^{N_b} b_k[l, m]\ \exp(-j\varphi_{l,k}) \quad [3]$$

where $\varphi_{l,k}$ are phases to be found which adds the vectors $b_k[l, m]$ constructively and maximizes the amplitude and signal-to-noise ratio (SNR) of the resultant vector $\zeta[l, m]$.

Coherent DAS uses the phase difference between every two fiber locations (spaced by m samples where m is positive integer) to detect the movement (e.g., vibration) between the two locations. This procedure is called beating, of which the output is used to determine the accumulated strain along the fiber section. This process generates four beating products $\zeta_{xx}, \zeta_{yy}, \zeta_{xy}, \zeta_{yx}$ using polarization diversity. Because of the slow and random polarization switching, both the amplitude and the phase relationship among the 4 products are random. A method is needed to combine the 4 products into a single output, for both improved SNR (signal to noise ratio) and polarization switching tolerance. This method is called a multi-polarization-state (MPSC) combining process and it combines the four beating results to just one ζ[n].

As will be understood and appreciated by those skilled in the art, the MPSC method must track a polarization change, and align the phase of different diversity terms before combining, while preserving signal frequency elements to accommodate different applications. Such polarization tracking must follow the phase movement and avoid a phase jump when the signal switches from one polarization to another. In addition, spatial averaging is preferred to solve Rayleigh fading, which may cause the signal to disappear for a while. As we shall show and describe, our inventive method of the instant application describes a method that advantageously fulfills at least all these requirements.

To understand our inventive method, let the beating products within a location be $\zeta_i(n)$ (i=1, 2, ... d, where d is the number of the polarization diversity, i.e., 4 in our case; n is time). The present invention first looks for the one having the maximum averaged power, then rotates all the other diversity terms to align with it.

To maintain phase continuity when the maximum power one changes from $\zeta_i$ to $\zeta_j$, the present invention uses the rotated result $\zeta_j(n) \cdot e^{\varphi_j(n-1)}$ as reference, to calculate the phase difference with other beating products. The phase rotation $\varphi_j(n-1)$ for $\zeta_j(n)$ remains constant ($\varphi_j(n-1)=\varphi_j(n)=\varphi_j(n+1)=\ldots$) as long as $\zeta_j$ has the maximum averaged power.

In terms of spatial diversity combining, the present invention takes the combined output ζ[n] from each fiber location (name it $\zeta^l(n)$), calculates each individual one's complex average $\overline{\zeta^l(n)}$, and then rotates all the other locations to the same pointing direction as the one having the maximum averaged power.

Let the one with maximum average power be $\zeta^m(n)$, the rotation for $\zeta^l(n)$ will be angle($\overline{\zeta^l(n)}* \cdot \overline{\zeta^m(n)}$). To keep the phase continuity when the maximum power changes from one location ($\zeta^i(n)$) to another ($\zeta^j(n)$), the present invention uses substantially the same approach as the above, which takes the rotated direction of $\zeta^j(n)$ as reference and makes all the other locations pointing to this reference direction before combining.

Frequency (including lambda) diversity is another scheme to solve Rayleigh fading. Our proposed solution can be applied to frequency diversity combining in the same way as polarization diversity, and it can be processed together, in the same step for the F*d beating products where F is the number of frequencies or lambdas, and d is the number of polarization combinations.

For polarization diversity combining within a location, we rotate the beating product which has the maximum averaging power by its last cycle's phase shift value, and use it as reference for other beating products, to rotate the others to that reference direction. This avoids phase jump when changing the reference beating product.

For spatial diversity combining, we use the output from each location and get its complex average; then use the one with the maximum average power as reference, and calculate the phase difference between each other location with the reference location, using the complex average (or average phase). Rotate each location by its corresponding difference. To keep phase continuity, the reference is first rotated by its last cycle's phase shift value.

In spatial diversity combining, only the last rotation value of the "current location" (the center location among the combining locations) is saved, so the memory complexity is O(1).

Elements of the prior discussion that may have relevance to the present disclosure may be found in U.S. patent application Ser. No. 16/879,505 entitled RAYLEIGH FADING MITIGATION VIA SHORT PULSE COHERENT DISTRIBUTED ACOUSTIC SENSING WITH MULTI-LOCATION BEATING-TERM COMBINATION of the instant Applicant and U.S. patent application Ser. No. 16/897,407 entitled IMPROVING PERFORMANCE OF RAYLEIGH-BASED PHASE OTDR WITH CORRELATION-BASED DIVERSITY COMBINING AND BIAS REMOVAL of the instant Applicant, each of which being incorporated by reference herein for all purposes as if set forth at length.

Figure 1:
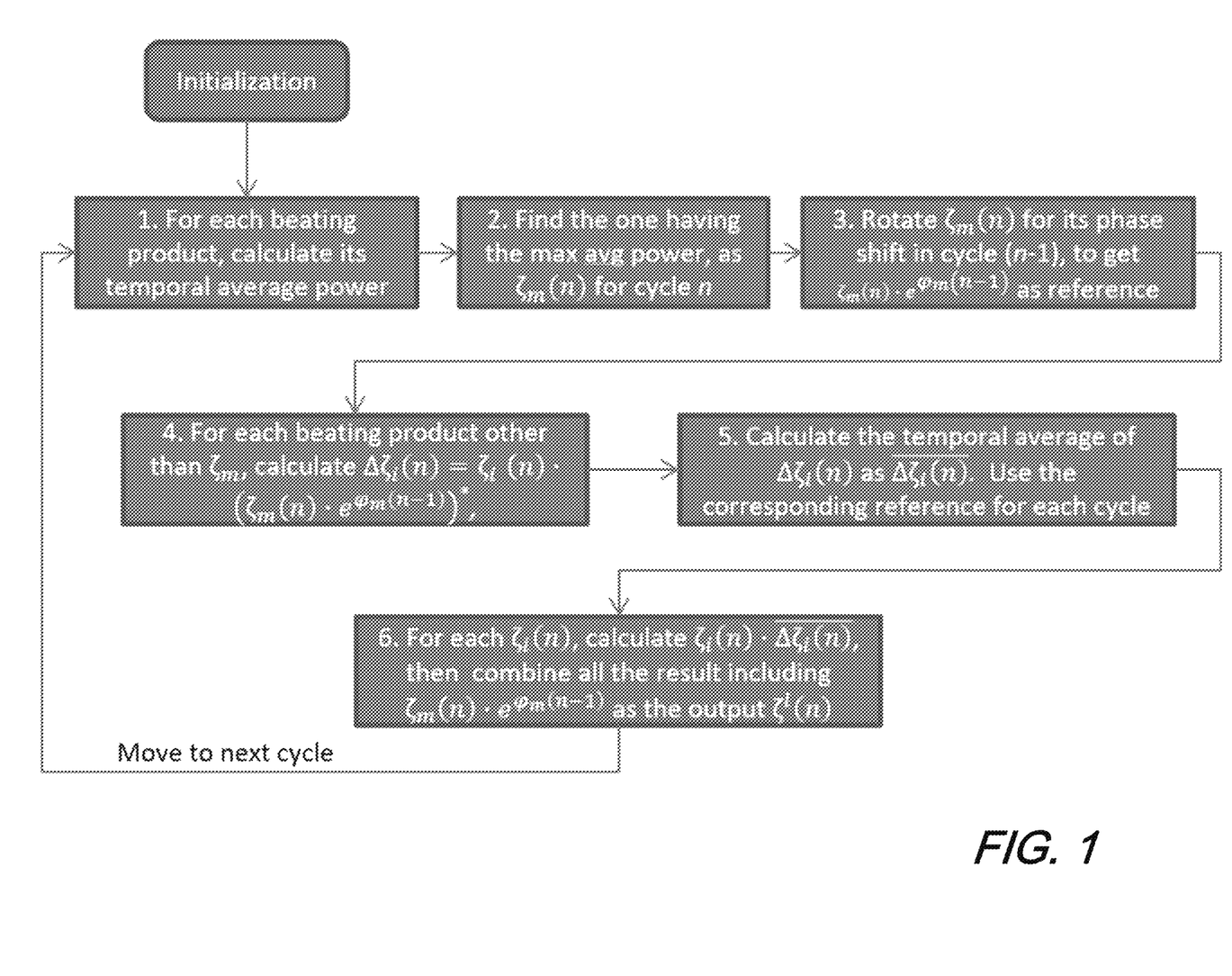
FIG. 1 is a schematic flow chart diagram of an illustrative polarization diversity combining method according to aspects of the present disclosure.

FIG. 1 is a schematic flow chart diagram of an illustrative polarization diversity combining method according to aspects of the present disclosure.

Below we use $\bar{x}$ for temporal average (or low-pass filtered value), x* for complex conjugate.

With reference to that FIG. 1, we note the first step is intra-location polarization diversity combining. Initially, all beating products are rotated by 0-degree (no rotation). Then, for each subsequent sample, use the following procedure.

Note that this procedure is repeated for each location. Within this procedure, step 3 adjusts the reference by using its rotation from a last cycle. This rotation won't change when $\zeta_m(n)$ exhibits a maximum averaged power. Steps 4 and 5 calculate the phase difference comparing to the reference. Finally—in step 6—the procedure compensates that difference so that all the beating products have their average phase well aligned before combining.

Figure 2:
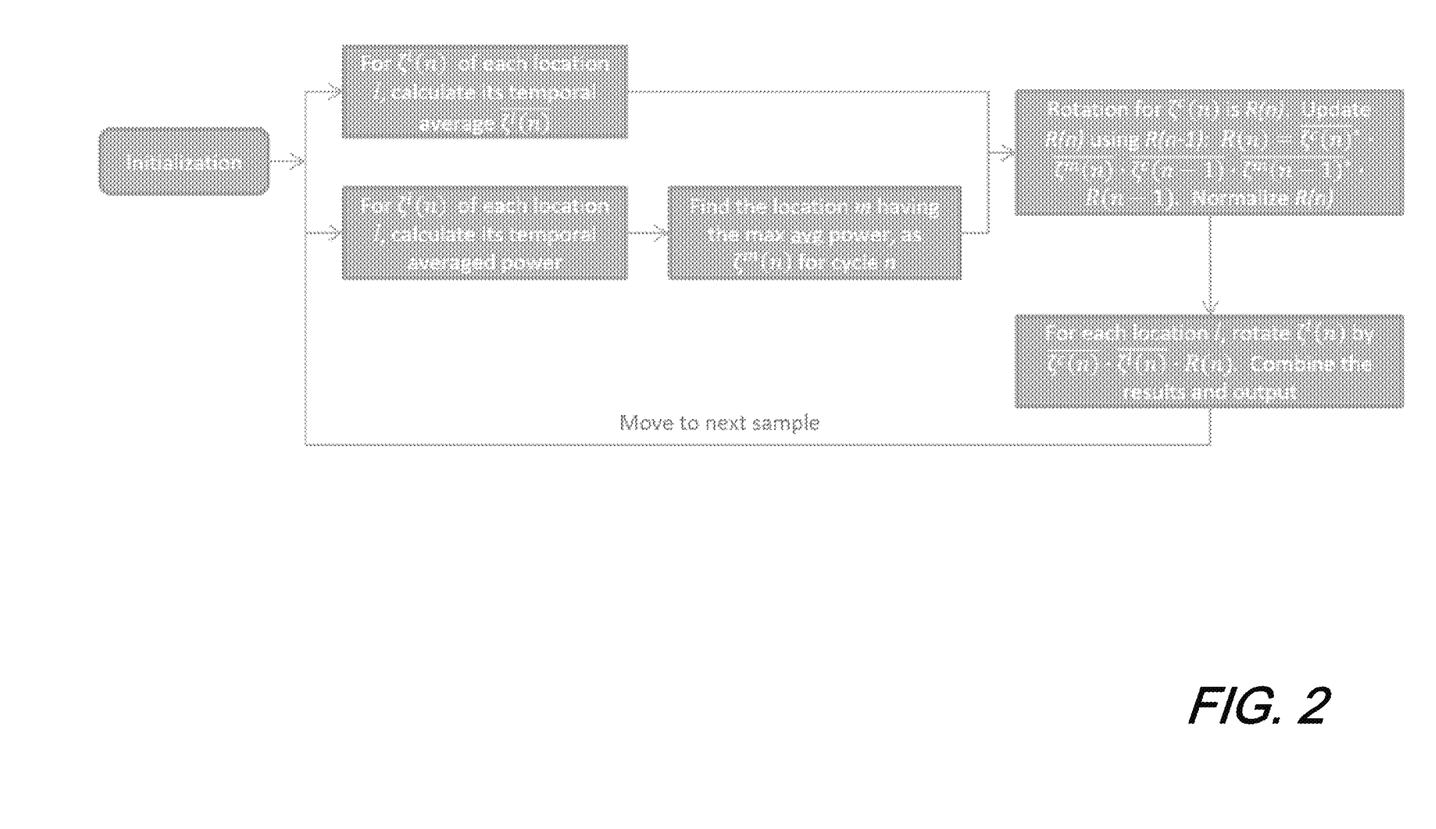
FIG. 2 is a schematic flow chart diagram of an illustrative spatial diversity combining method according to aspects of the present disclosure.

FIG. 2 is a schematic flow chart diagram of an illustrative spatial diversity combining method according to aspects of the present disclosure.

With reference to this figure, we note that the next operation is inter-location spatial combining, using the above output $\zeta^l(n)$. Consider the location currently being calculated is location c, and its complex output from polarization diversity combining is $\zeta^c(n)$ then use the following processing procedure.

Diversity combining in coherent DAS provides a tolerance to polarization rotation and Rayleigh fading. Note that we must properly align the beating products before combining to strengthen the signal rather than cancel it. It first finds the term that has the maximum power, and then calculates the phase difference by correlating the other terms with it. This difference is averaged and used to align each other term.

Figure 3A:
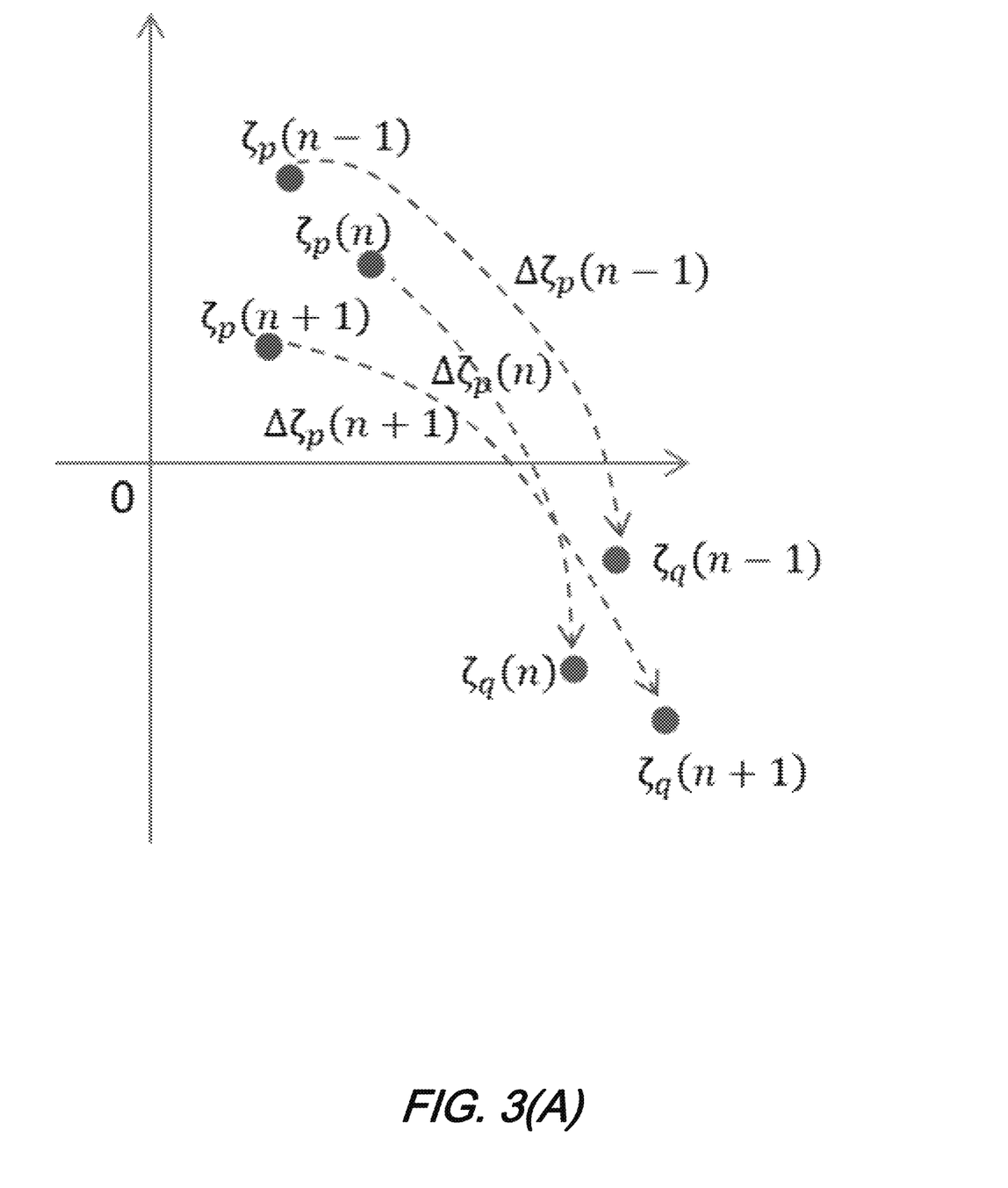
FIG. 3(A), FIG. 3(B) FIG. 3(C) FIG. 3(D), are a series of illustrations showing polarization combining of two terms to determine an output according to aspects of the present disclosure.
Figure 3B:
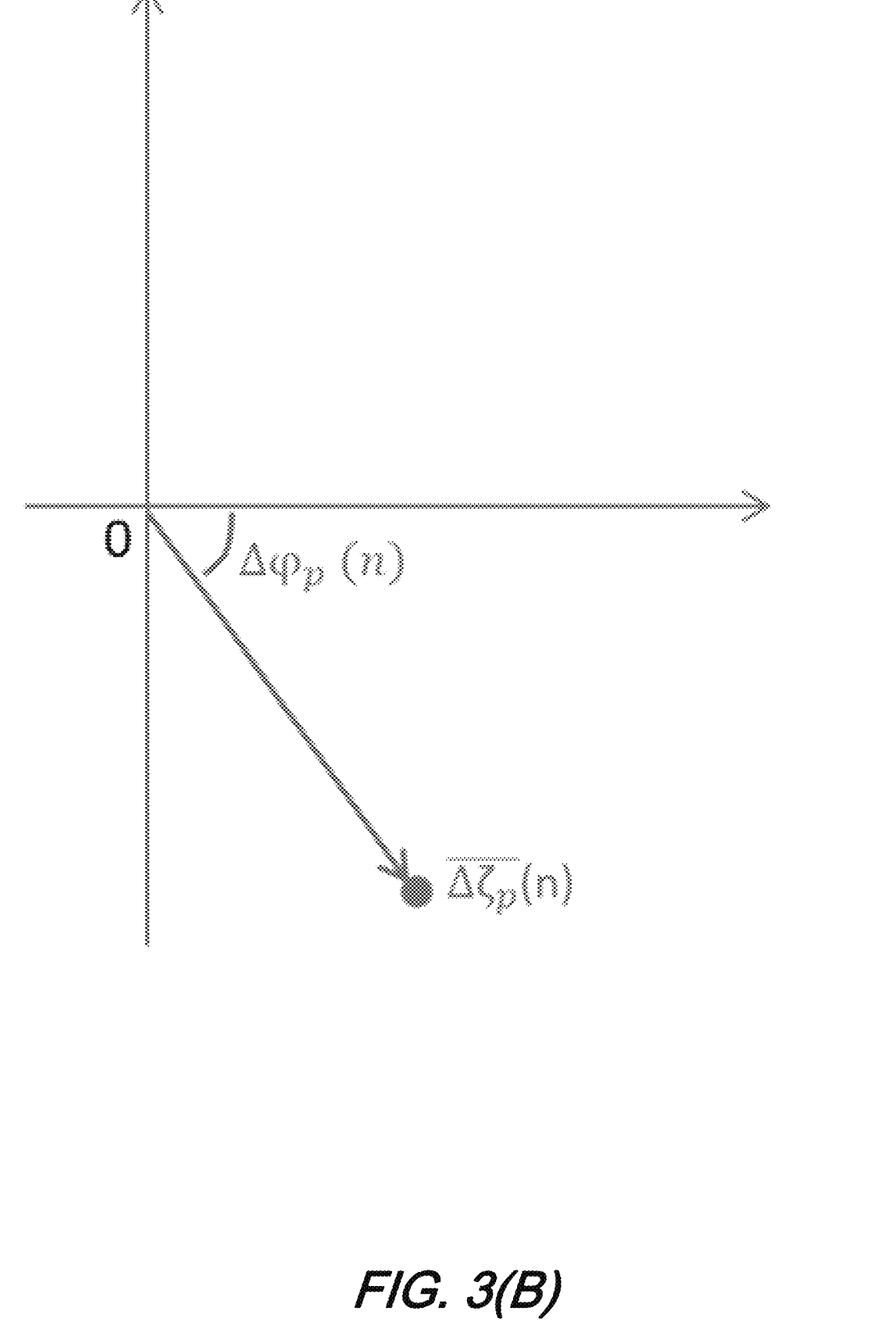

For example, consider polarization diversity combining of two terms, $\zeta_p(n)$ and $\zeta_q(n)$, as in FIG. 3(A) FIG. 3(B), to calculate the output of $\zeta(n)$. The average is from 3 neighboring samples, $\zeta_p(n-1)$, $\zeta_p(n)$, $\zeta_p(n+1)$, and $\zeta_q(n-1)$, $\zeta_q(n)$, $\zeta_q(n+1)$. $\zeta_q(n)$ has higher average power than $\zeta_p(n)$.

Figure 3C:
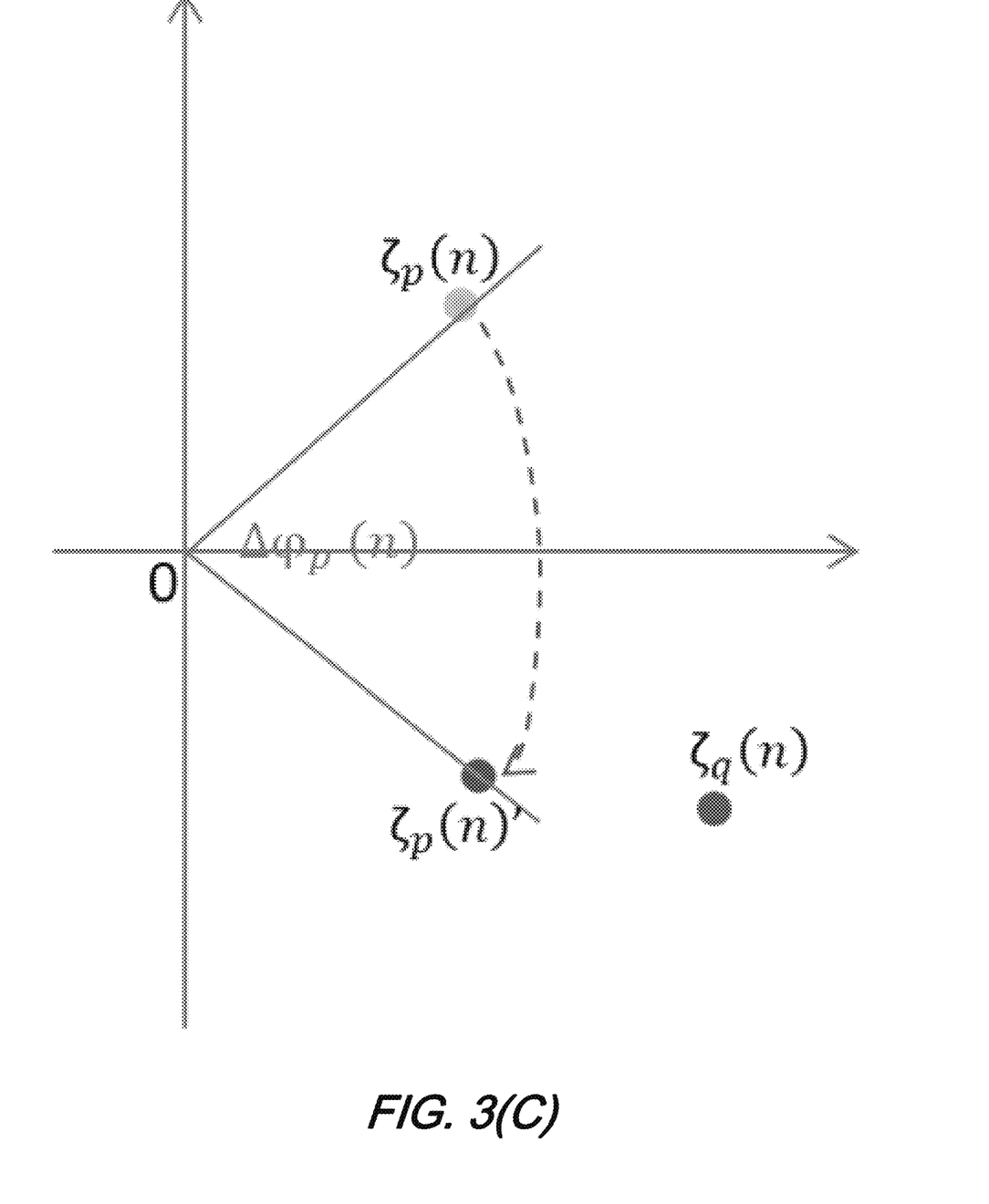
Figure 3D:
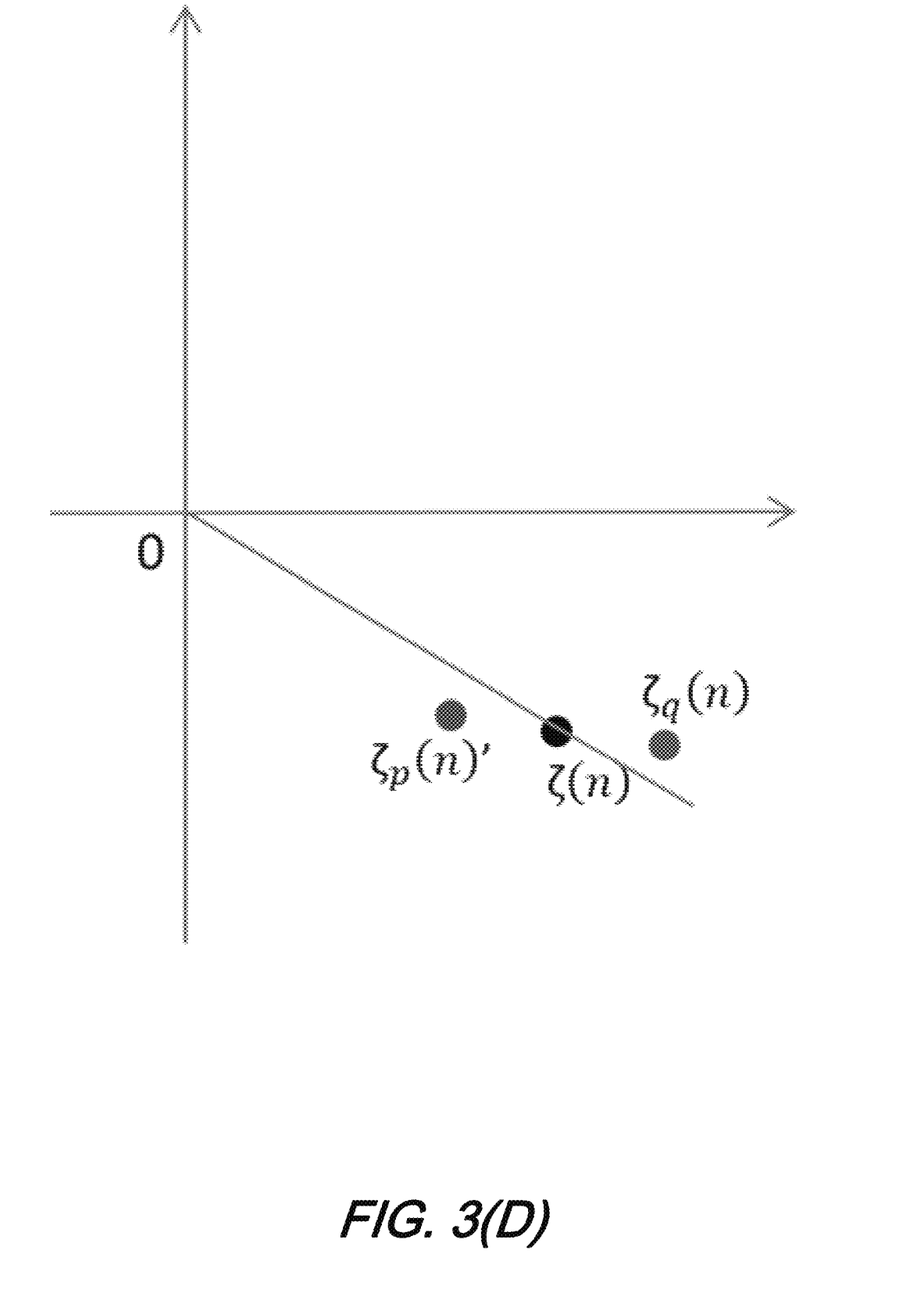

The first step (FIG. 3(A)) calculates the complex direction difference between $\zeta_p(n+k)$ and $\zeta_q(n+k)$ (k=−1, 0, 1), using $\Delta\zeta_p(n+k)=\zeta_p(n+k)\cdot\zeta_q(n+k)^*$. The second step (FIG. 3(B)) calculates the average $\overline{\Delta\zeta_p}(n)$ from $\Delta\zeta_p(n+k)$ (k=−1, 0, 1), and its corresponding angle $\Delta\zeta_p p(n)$. The third step in FIG. 3(C) rotates $\zeta_p(n)$ by $\Delta\varphi_p(n)$ to have $\zeta_p(n)'$, which is phase aligned with $\zeta_q(n)$, so the two terms can be added together to have output $\zeta(n)$ (FIG. 3(D)).

With this method, when the highest power term changes from one to another, there will be phase discontinuity if there is phase difference between the new term and the old one. For example in the FIG. 3(A)-FIG. 3(D), if next cycle $\zeta_p(n+1)$ has higher averaged power, using the above method, $\zeta_q(n+1)$ will be rotated to align with $\zeta_p(n+1)$, so the output $\zeta(n+1)$ will have different phase offset than $\zeta(n)$. To solve this problem, we use the phase rotated value as reference, to calculate the phase difference with other terms. In FIG. 3, if next cycle $\zeta_p(n+1)$ has the higher averaged power, we have $$\zeta_p(n+1)' = \zeta_p(n+1) \cdot e^{-j \cdot \Delta\varphi_p(n)} \quad [4]$$

This is the reference we use to calculate the difference with $\zeta_q(n+1)$, which is:

$$\Delta\zeta_q(n+1) = \zeta_q(n+1) \cdot (\zeta_p(n+1)')^* = \zeta_q(n+1) \cdot (\zeta_p(n+1) \cdot e^{-j \cdot \Delta\varphi_p(n)})^* \quad [5]$$

Figure 4:
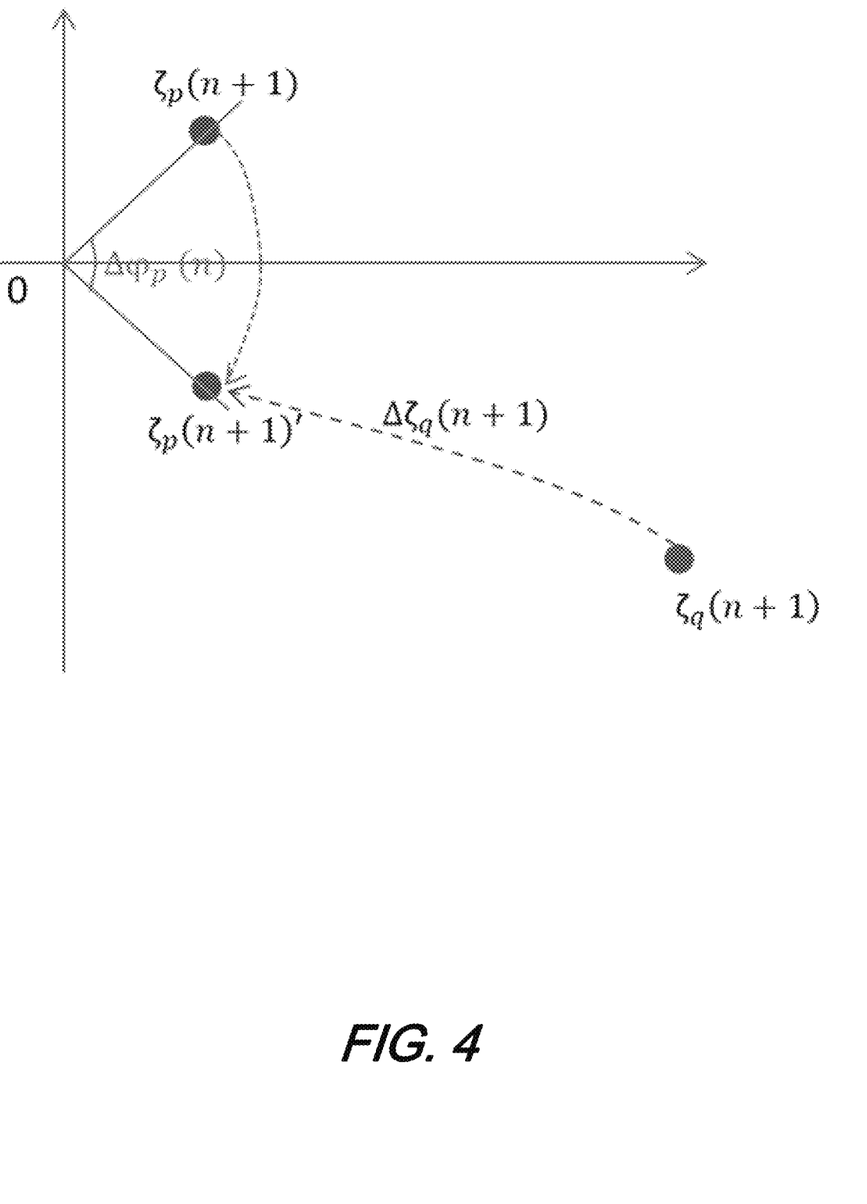
FIG. 4 is an illustration showing comparison of phase difference using phase shifted reference according to aspects of the present disclosure.

The illustration of this concept is presented in FIG. 4. When doing average, use the calculated $\Delta\zeta_q(n+k)$ for cycle (n+k) from the cycle's corresponding reference $\zeta_m(n+k) \cdot e^{-j \cdot \Delta\varphi_m(n+k-1)}$ ($\zeta_m(n+k)$ is the one having the maximum average power in cycle (n+k), and its phase shift in cycle (n+k−1) is $-\Delta\varphi_m(n+k-1)$). The subsequent steps after calculating the phase differences are the same as FIGS. 3(B~D)

Note that when calculating $\Delta\zeta_i(n)$, for k≥1, $\Delta\varphi_m(n+k-1)$ is not available, so the workaround solution is using k≤0. Alternatively, consider that for each sample, the phase only has minor change, we can use $\Delta\varphi_m(n-1)$ for k≥1.

In actual implementation, the phase offset/rotation can be achieved in complex domain rather than using angle. Averaging can be realized using low-pass filter (LPF), either FIR (including moving average) or IIR. Consider a more general case with any number of diversity terms. Let $\zeta_{r_i}(n)$ be the rotation of the i-th term in cycle n, and the one with maximum power is the m-th. Then $\zeta_{r_i}(n)$ can be calculated using:

$$\zeta_{r_i}(n) = LPF(\zeta_i(n) \cdot (\zeta_m(n) \cdot \zeta_{r_m}(n-1)^*)^*) \quad [6]$$

Here $\zeta_m(n) \cdot \zeta_{r_m}(n-1)^*$ rotates $\zeta_m(n)$ by its last cycle's phase shift value, to be used as reference; $\zeta_i(n) \cdot (\zeta_m(n) \cdot \zeta_{r_m}(n-1)^*)^*$ calculates the phase difference of $\zeta_i(n)$ with this reference, to align the eventually rotated signals all to the same direction. To have roughly unit amplitude, Equation (3) can be modified by normalizing with the amplitude of $\zeta_m(n)$ and $\zeta_i(n)$, as:

$$\zeta_{r_i}(n) = LPF\left(\zeta_i(n) \cdot \frac{(\zeta_m(n) \cdot \zeta_{r_m}(n-1)^*)^*}{|\zeta_m(n)| \cdot |\zeta_i(n)|}\right) \quad [7]$$

The combined output will be $$\zeta(n) = \sum_i \zeta_i(n) \cdot \zeta_{r_i}(n)^* \quad [8]$$

The above steps of polarization diversity combining within one location can be found in FIG. 1. Note that this procedure can also be used for frequency/lambda diversity combining, and other diversity combining if the processing resource is not the limit.

Figure 5:
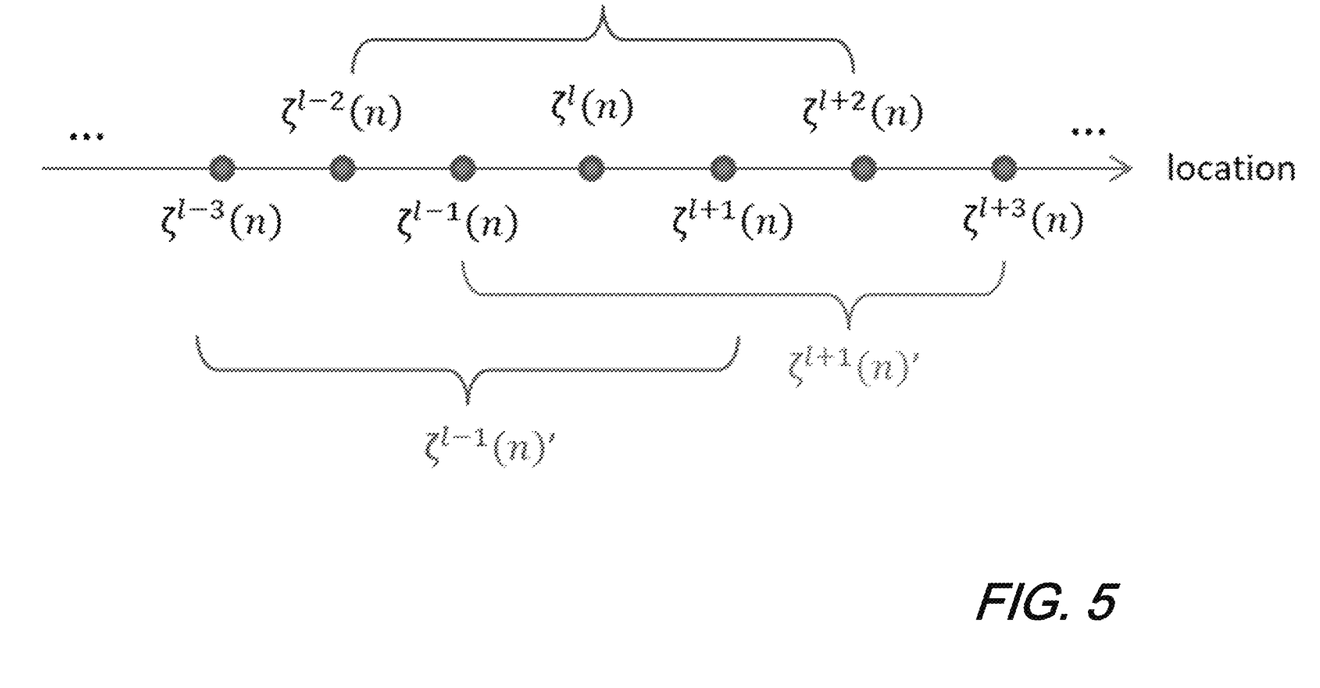
FIG. 5 is an illustration showing combining of spatial diversity according to aspects of the present disclosure.

Using ultra-short pulse is expected to solve Rayleigh fading problem through spatial combining, by sacrificing spatial resolution (comparing to pulse width which is finer than needed). For example, in FIG. 5, assume spatial diversity combining uses 5 neighboring locations, For the output from location (l–1), it can be combined from locations [l–3, l+1]; location l can be the combined output from locations [l–2,l+2], and so on. We call location c the "current" location when calculating $\zeta^c(n)'$.

However, with the above polarization diversity combining method, the phase offset in each location's output can be different from its neighboring locations. Though we can do spatial combining the same way as polarization combining, from equation (4), each location needs to buffer the internal state for those it participates, so the complexity becomes L times. Here we describe a solution with the following steps to reduce the complexity.

First, take the temporal averaged power from each location's polarization combining output, and use the location of the largest power as the reference location m.

Next, for polarization diversity combined output $\zeta^l(n)$ from each location l, calculate its temporal average $\overline{\zeta^l(n)}$ Finally, calculate the difference between $\overline{\zeta^l(n)}$ and $\overline{\zeta^m(n)}$, then rotate each $\overline{\zeta^l(n)}$ to the same direction as $\overline{\zeta^m(n)}$ and combine together.

Similar to a location's intra-combining method proposed above, to preserve phase continuity when maximum power location changes from one to another, the reference for other locations to compare with is $\overline{\zeta^m(n)}$ rotated by its last cycle's phase shift. This phase shift value is different for each "current" location. For example, in FIG. 5, cycle n, suppose location l–1 has the maximum averaged power when calculating both $\zeta^l(n)'$ and $\zeta^{l-1}(n)'$ (i.e., it's the highest among [l–3,l+3] at cycle n). Then its phase shift value used for the calculation of $\zeta^l(n)'$ and $\zeta^{l-1}(n)'$ can be different. For this reason, the phase rotating value to be saved for each location at each cycle is always the one for the current location ($R^c(n)$) when calculating $\zeta^c(n)'$). Meanwhile, the phase shift value of the reference location needs to stay constant, which means $$R^m(n) = R^m(n-1) \quad [9]$$

By saving $R^c(n)$, the actual phase difference comparison is between each other location and the current location, using:

$$\overline{\zeta^l(n)} \cdot (\overline{\zeta^c(n)} \cdot R^c(n))^* \quad [10]$$

This is the rotation value for each location (including c), so from equation (6) and (7), we can have $$\overline{\zeta^m(n)} \cdot (\overline{\zeta^c(n)} \cdot R^c(n))^* = \overline{\zeta^m(n-1)} \cdot (\overline{\zeta^c(n-1)} \cdot R^c(n-1))^* \quad [11]$$

Consider $R^c(n)$ is normalized to unit circle, from equation (8) we can get $$R^c(n) = \overline{\zeta^m(n-)}^* \cdot \overline{\zeta^c(n-1)} \cdot R^c(n-1) \cdot \overline{\zeta^m(n)} \cdot \overline{\zeta^c(n)}^* \quad [12]$$

which gives how $R^c(n)$ is updated. With $R^c(n)$ updated, the next step is to rotate each location using $$\zeta^l(n) \cdot (\overline{\zeta^l(n)} \cdot (\overline{\zeta^c(n)} \cdot R^c(n))^*)^* = \zeta^l(n) \cdot \overline{\zeta^l(n)}^* \cdot (\overline{\zeta^c(n)} \cdot R^c(n)) \quad [13]$$

and then sum the above result for each combining locations to have final output. Note that when $\overline{\zeta^c(n)}$ becomes small that may cause larger error because of limited precision, it needs to be scaled/enlarged by a pre-defined value.

Alternatively, for each location, it can use the maximum power location and its rotation value calculated from last cycle, while update these field afterwards, and save the updated values for next cycle. For example, in cycle n, among the spatial averaging locations, location m has the maximum averaged power from cycle (n–1), marked m(n–1), with rotation value $R^{m(n-1)}(n-1)$. Each participating location l will rotate by $\overline{\zeta^l(n-1)} \cdot (\overline{\zeta^{m(n-1)}}(n-1) \cdot R^{m(n-1)}(n-1))^*$. After that, new maximum location will be calculated, as m(n), and its rotation value $\overline{\zeta^{m(n)}}(n-1) \cdot (\overline{\zeta^{m(n-1)}}(n-1) \cdot R^{m(n-1)}(n-1))^*$ will be saved for next cycle use.

Figure 6A:
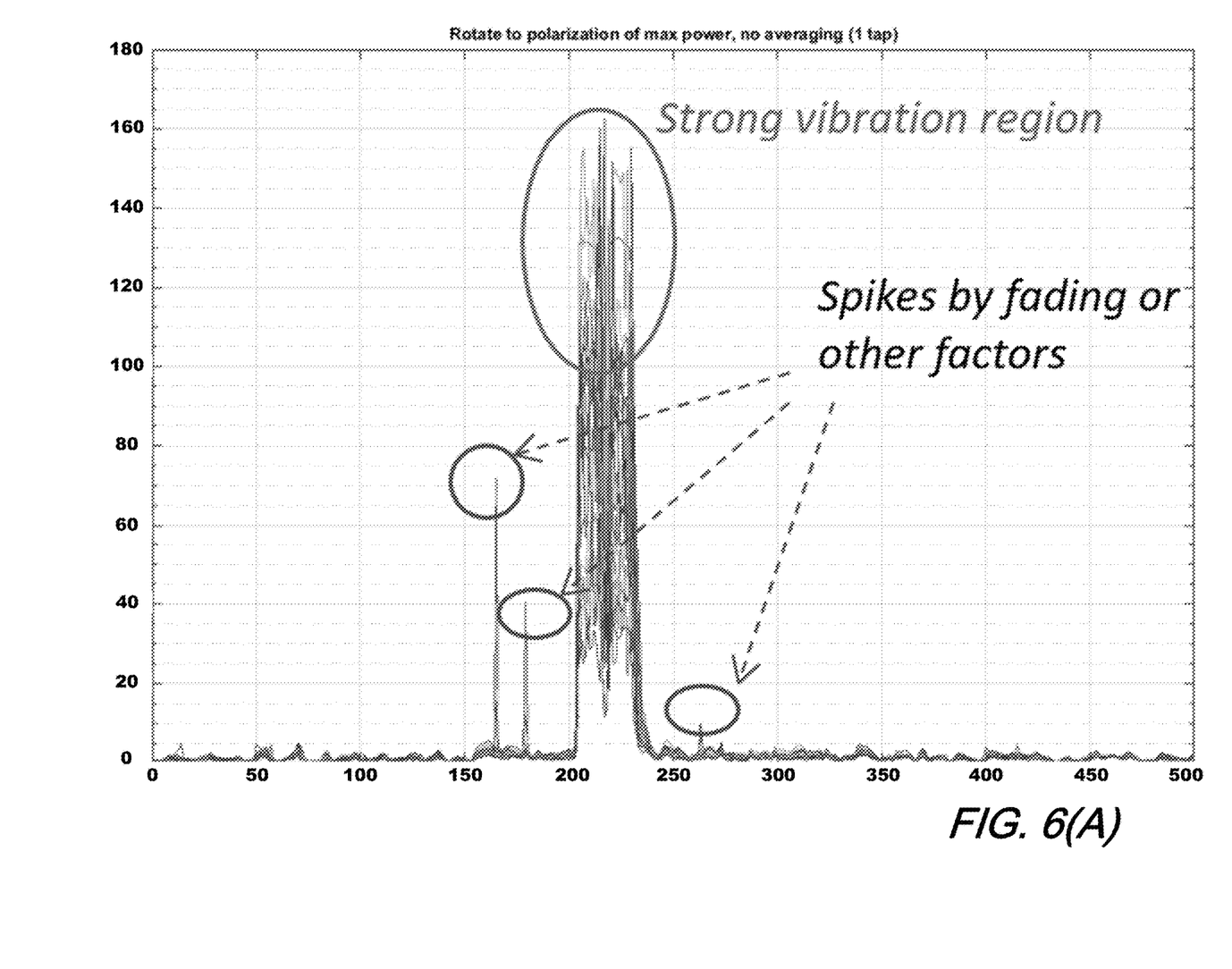
Figure 6B:
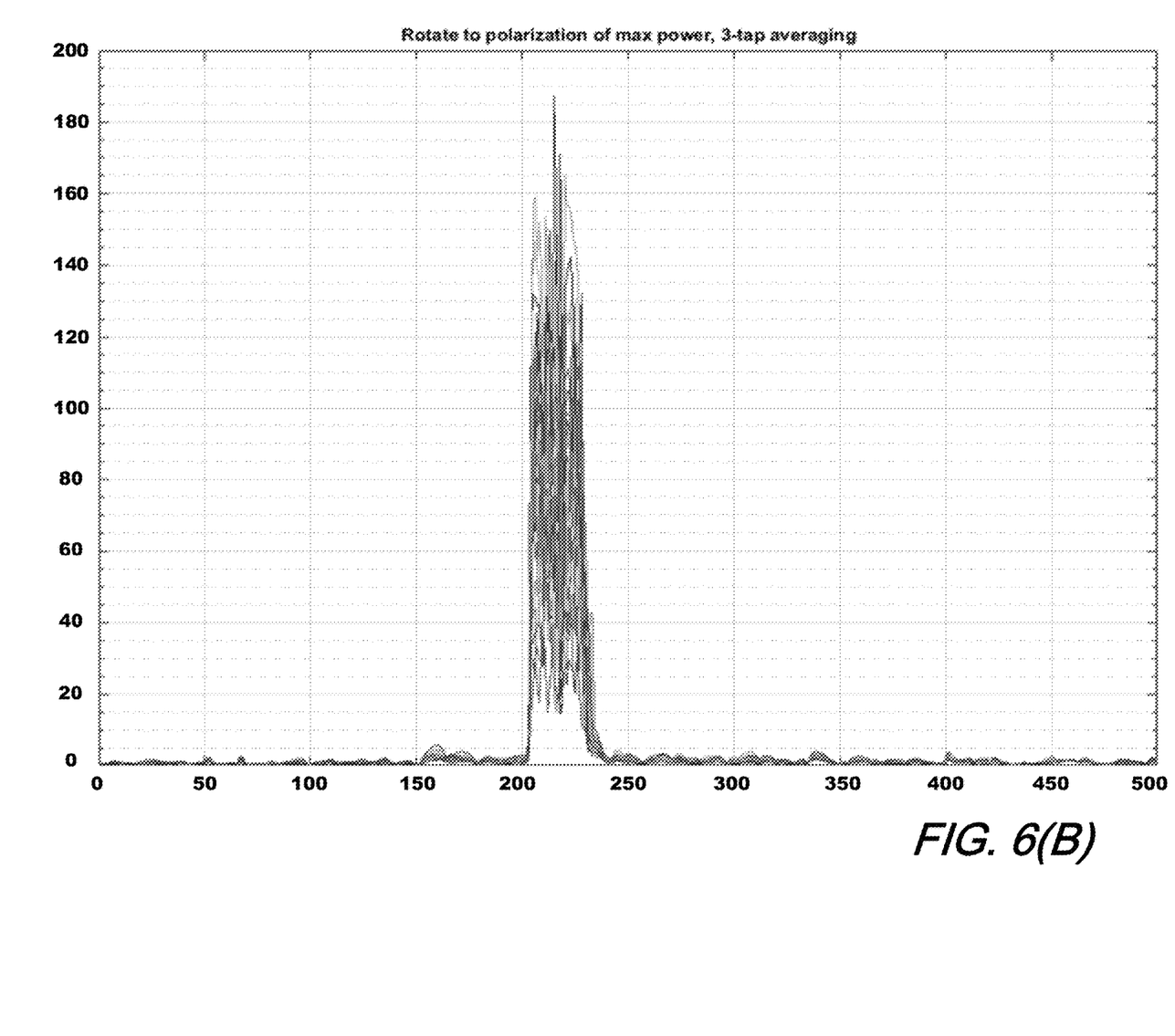
Figure 6C:
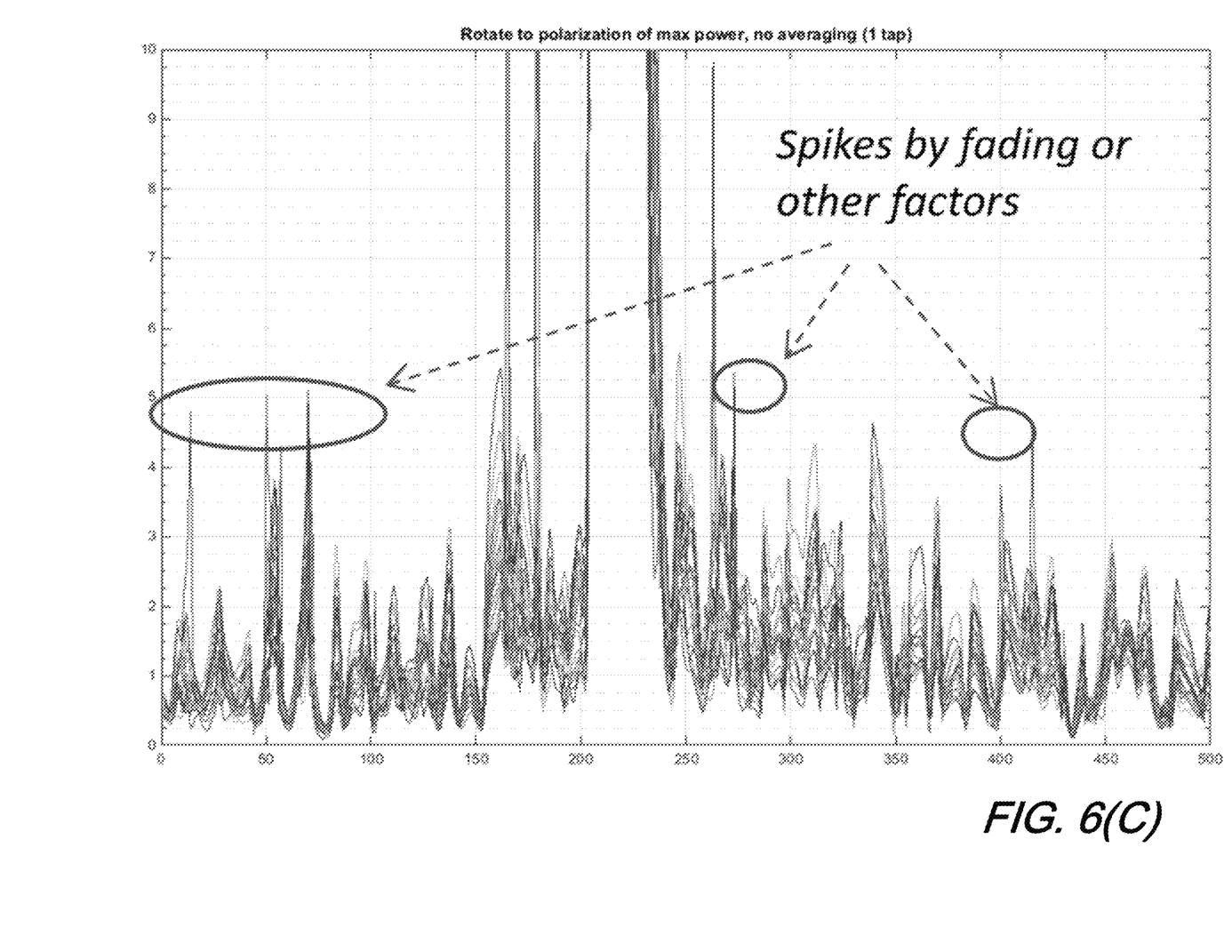
Figure 6D:
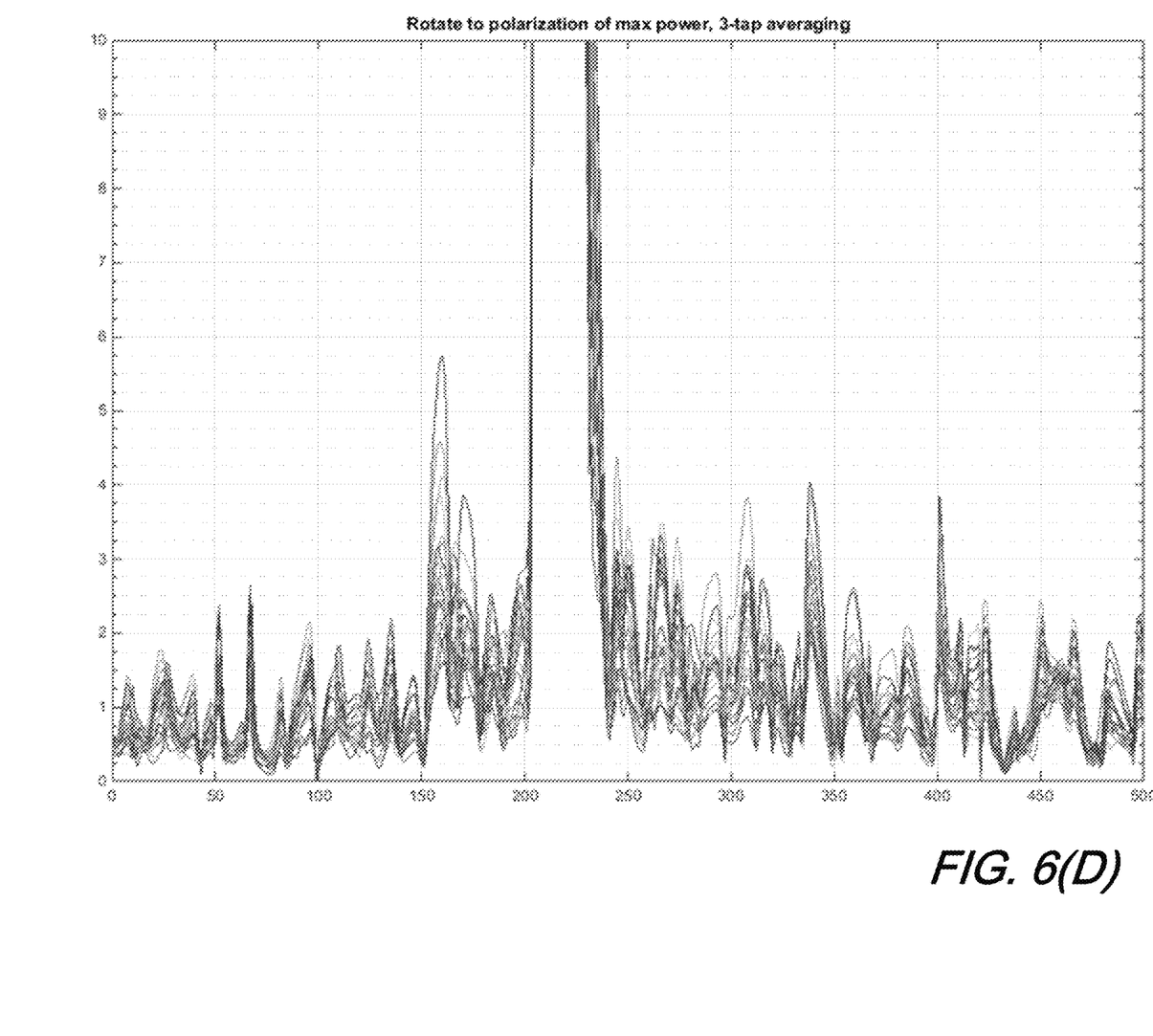

FIG. 6(A), FIG. 6(B) FIG. 6(C) and FIG. 6(C) shows result comparison with and without spatial combining. The result is considered as "vibration amplitude", by first converting the diversity combined signal to unwrapped phase, then passing through a low-pass-filter to remove the DC factor, and further through a low-pass-filter to remove higher frequency noise. Without spatial combining (FIG. 6(A), FIG. 6(C)), there are some spikes observed at the vibration output, while with 3-location spatial combining, the performance is greatly improved.

Figure 7:
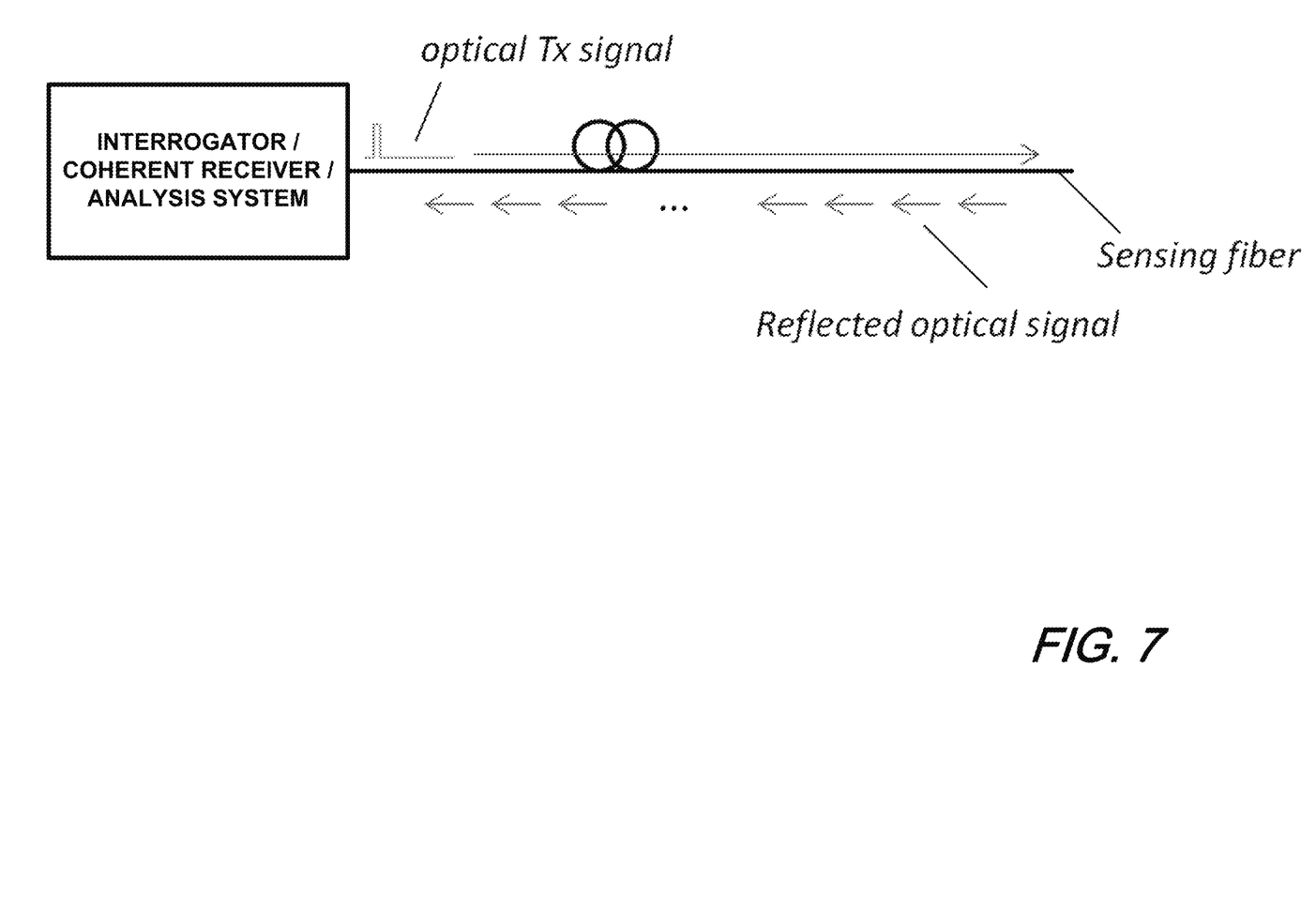
FIG. 7 is a schematic block diagram of an illustrative DFS system including interrogator and coherent receiver and analysis system according to aspects of the present disclosure.

FIG. 7 is a schematic diagram illustrating a DAS system including an interrogator, coherent receiver, and analysis/analyzer optically connected to a sensor fiber according to aspects of the present disclosure.

While we have presented this disclosure using some specific examples, those skilled in the art will recognize that our teachings are not so limited. Accordingly, this disclosure should be only limited by the scope of the claims attached hereto.

The invention claimed is:

1. A distributed optical fiber sensing (DOFS)/distributed acoustic sensing (DAS) method employing polarization diversity combining and spatial diversity combining for a DOFS/DAS system having
   a length of optical fiber; and
   an optical interrogator unit that generates optical pulses, introduces them into the optical fiber and receives Rayleigh reflected signals from the fiber; and a coherent receiver unit configured to extract information from the Rayleigh reflected signals, the method comprising:

operating the DOFS/DAS system to obtain a respective set of beating products for a plurality of locations along the length of the optical fiber;

performing a polarization diversity combining for each one of the sets of the beating products; and using the polarization diversity combining for each one of the sets of the beating products, performing a spatial diversity for each of the plurality of locations along the optical fiber;

wherein the polarization diversity combining comprises:
  determining a temporal average product for each beating product;
  determining one having a max average power;
  rotating that one having max average power for its phase shift to produce a reference;
  determining a phase difference for each beating product as compared to the reference;
  compensating any phase difference such that all beating products exhibit a well-aligned phase; and
  combining the beating products.

2. A distributed optical fiber sensing (DOFS)/distributed acoustic sensing (DAS) method employing polarization diversity combining and spatial diversity combining for a DOFS/DAS system having a length of optical fiber; and an optical interrogator unit that generates optical pulses, introduces them into the optical fiber and receives Rayleigh reflected signals from the fiber; and a coherent receiver unit configured to extract information from the Rayleigh reflected signals, the method comprising:

operating the DOFS/DAS system to obtain a respective set of beating products for a plurality of locations along the length of the optical fiber;

performing a polarization diversity combining for each one of the sets of the beating products; and using the polarization diversity combining for each one of the sets of the beating products, performing a spatial diversity for each of the plurality of locations along the optical fiber;

wherein the polarization diversity combining comprises:
  determining a temporal average product for each beating product
  determining one having a max average power;
  rotating that one having max average power for its phase shift to produce a reference;
  determining a phase difference for each beating product as compared to the reference;
  compensating any phase difference such that all beating products exhibit a well-aligned phase; and combining the beating products;

wherein the spatial diversity combining comprises:
  using the combined beating products for each location, determine a temporal average power;
  determine a location having a greatest average power; and
  combining the results and
  providing an indicia of the combined result(s).

* * * * *